US007641816B2

(12) United States Patent
Mizumoto

(10) Patent No.: US 7,641,816 B2
(45) Date of Patent: Jan. 5, 2010

(54) SEMICONDUCTOR RUBBER COMPOSITION AND SEMICONDUCTIVE RUBBER ROLLER

(75) Inventor: Yoshihisa Mizumoto, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 284 days.

(21) Appl. No.: 11/400,221

(22) Filed: Apr. 10, 2006

(65) Prior Publication Data

US 2006/0284142 A1 Dec. 21, 2006

(30) Foreign Application Priority Data

Jun. 20, 2005 (JP) ............................ 2005-179694

(51) Int. Cl.
*H01B 1/04* (2006.01)
*B65D 39/00* (2006.01)
*B29C 47/00* (2006.01)

(52) U.S. Cl. .................... 252/511; 428/36.8; 428/36.9; 252/502

(58) Field of Classification Search ................ 252/502; 428/36.8, 36.9
See application file for complete search history.

(56) References Cited

U.S. PATENT DOCUMENTS

2003/0096917 A1 5/2003 Hattori et al.
2004/0024166 A1 2/2004 Hattori et al.
2004/0106708 A1 6/2004 Mizumoto et al.
2004/0247340 A1 * 12/2004 Miura et al. ................ 399/176

FOREIGN PATENT DOCUMENTS

| | | | | |
|---|---|---|---|---|
| CN | 1500834 | A | | 6/2004 |
| JP | 09-146345 | | * | 6/1997 |
| JP | 09-146345 | A | | 6/1997 |
| JP | 2000-119449 | A | | 4/2000 |
| JP | 2001-099138 | A | | 4/2001 |
| JP | 2002-121376 | A | | 4/2002 |
| JP | 2003-183494 | A | | 7/2003 |
| JP | 2003-270885 | A | | 9/2003 |
| JP | 2004-176056 | | * | 6/2004 |
| JP | 2004-176056 | A | | 6/2004 |

* cited by examiner

*Primary Examiner*—Mark Kopec
*Assistant Examiner*—Jaison P Thomas
(74) *Attorney, Agent, or Firm*—Birch, Stewart, Kolasch & Birch, LLP

(57) ABSTRACT

A semiconductive rubber composition contains copolymerized rubber containing ethylene oxide; chloroprene rubber; and acrylonitrile-butadiene rubber. A conductive rubber roller has a conductive rubber layer composed of the semiconductive rubber composition on an outermost layer thereof.

6 Claims, 1 Drawing Sheet

SEMICONDUCTOR RUBBER COMPOSITION AND SEMICONDUCTIVE RUBBER ROLLER

This nonprovisional application claims priority under 35 U.S.C. § 119(a) on Patent Application No(s). 2005-179694 filed in Japan on Jun. 20, 2005, the entire contents of which are hereby incorporated by reference.

BACKGROUND OF THE INVENTION

1. Field of the Invention

The present invention relates to a semiconductive rubber composition and a conductive rubber roller composed of the semiconductive rubber composition. More particularly, the conductive rubber roller is mounted as a developing roller or the like in image-forming apparatuses such as a copying apparatus, a printer, and the like.

2. Description of the Related Art

In recent years, in the printing technique using the electrophotographic method, a high-speed printing operation, formation of a high-quality image, formation of a color image, and miniaturization of image-forming apparatuses have been progressively made and become widespread. Toner holds the key to these improvements. To satisfy the above-described demands, it is necessary to form finely divided toner particles, make the diameters of the toner particles uniform, and make the toner particles spherical. Regarding the technique of forming the finely divided toner particles, toner having a diameter not more than 10 μm and toner not more than 5 μm have been developed recently. Regarding the technique of making the toner spherical, toner having not less than 99% in its deviation from a spherical form has been developed. To form the high-quality image, polymerized toner has come to be widely used instead of pulverized toner conventionally used. The polymerized toner allows the reproduction of dots to be excellent in obtaining printed matters from digital information and hence a high-quality printed matter to be obtained.

In correspondence to the improvement in the technique of forming finely divided toner particles, making the diameters of the toner particles uniform, making the toner particles spherical, and the transition from the pulverized toner conventionally used to the polymerized toner, conductive rubber members such as a conductive rubber roller constituting an image-forming apparatus adopting the electrophotographic method are demanded to have high-performance functions. For example, the conductive rubber member is demanded to have a uniform electrical characteristic on its the inner peripheral surface or on its in-plane. The conductive rubber member is also demanded to have a mechanical property which hardly changes for a long time. That is, it is necessary that the conductive rubber member does not wear nor modify for a long time when toner contacts the conductive rubber member or flows into a sliding contact portion of a member of the image-forming apparatus. The conductive rubber member is also demanded to have an electrical characteristic which hardly changes for a long time, when substances adhere to the surface thereof.

To comply with such a demand, the present inventors have developed various conductive compositions and proposed inventions disclosed in the following patent documents 1, 2, and 3.

In Japanese Patent Application Laid-Open No. 2003-183494, the polymer composition containing the epichlorohydrin-ethylene oxide-allyl glycidyl ether copolymer and the chloroprene rubber as its main components and sulfur and thioureas is disclosed in claim 2 and the example 4.

But the polymer composition has a comparatively high hardness and an insufficient elongation percentage. Thus the polymer composition has room for improvement in this respect. Therefore a developing roller composed of the above-described polymer composition has room for improvement so that a sufficient electrification amount is imparted to toner to obtain a high-quality image. In addition, the polymer composition has room for improvement of its wear resistance to prevent the occurrence of a disadvantage for a long time that toner leaks from a sealing portion of a toner cartridge as a result of wear of the developing roller owing to friction between it and the sealing portion of the toner cartridge.

In the patent document 1, although it is necessary to form an oxide film on the surface of the developing roller to form a high-quality image and reduce the friction coefficient of the surface thereof, no reference is made in the specification. Therefore the efficiency of the formation of the oxide film is not studied in the patent document 1.

In claims 1, 7 and the examples 13, 15 of the patent document 2, the conductive elastomer composition is disclosed in Japanese Patent Application Laid-Open No. 2004-176056 (patent document 2). The conductive elastomer composition contains the epichlorohydrin-ethylene oxide-allyl glycidyl ether terpolymer mixed with the chloroprene rubber. The conductive elastomer composition contains further contains sulfur and thioureas used in combination for crosslinking. The conductive elastomer composition further contains the anion-containing salt having the fluoro group and the sulfonyl group. The conductive elastomer composition has a specified volume resistivity, compression set, and hardness.

The conductive elastomer composition disclosed in the patent document 2 has room for improvement in terms of its elongation percentage. Therefore a developing roller composed of the above-described conductive elastomer composition has room for improvement of its wear resistance to prevent the occurrence of a disadvantage for a long time that toner leaks from a sealing portion of a toner cartridge as a result of wear of the developing roller owing to friction between it and the sealing portion of the toner cartridge.

In the patent document 2, the conductive elastomer containing acrylonitrile-butadiene rubber (hereinafter referred to as NBR) instead of the chloroprene rubber is disclosed in paragraph [0037] and the examples 12, 14.

The epichlorohydrin-ethylene oxide-allyl glycidyl ether terpolymer and the NBR have a high polarity respectively and mix with each other comparatively easily. The epichlorohydrin-ethylene oxide-allyl glycidyl ether terpolymer is hydrophilic and contains chlorine, whereas the NBR is slightly hydrophilic and does not contain chlorine. Therefore the terpolymer and the NBR do not mix with each other nor disperse finely. Consequently the conductive elastomer composition is not sufficient in its strength and elongation percentage. The conductive elastomer composition has room for improvement in terms of its wear resistance so that the conductive elastomer composition can be used to compose a conductive member, for example, a developing roller which makes sliding contact with other member. More specifically, the developing roller rubs on the sealing portion of the toner cartridge.

In both modes of the conductive elastomer composition described in the patent document 2, it is difficult to stably form the oxide film by irradiating the surface thereof with ozone or ultraviolet rays. Therefore the conductive elastomer composition has room for improvement to allow the oxide film to be stably formed and a mass-production to be accomplished.

The conductive rubber composition is disclosed in Japanese Patent Application Laid-Open No. 2002-121376 (patent document 3). The conductive rubber composition contains the ethylene oxide-propylene oxide-allyl glycidyl ether terpolymer having the specified ratio among the monomers and molecular weight. The conductive rubber composition further contains the NBR and the epichlorohydrin rubber at the predetermined rate.

Similarly to the reason described on the conductive elastomer composition described in the patent document 2, the components of the conductive rubber composition of the patent document 3 do not disperse finely. Consequently the conductive rubber composition is not sufficient in its strength and elongation percentage. A member composed of the conductive rubber composition has room for improvement in terms of its wear resistance.

In the patent document 3, although it is necessary to form an oxide film on the surface of the developing roller to form a high-quality image, no reference is made in the specification. Therefore the efficiency of the formation of the oxide film is not studied in the patent document 3.

Patent document 1: Japanese Patent Application Laid-Open No. 2003-183494

Patent document 2: Japanese Patent Application Laid-Open No. 2004-176056

Patent document 3: Japanese Patent Application Laid-Open No. 2002-121376

SUMMARY OF THE INVENTION

It is an object of the present invention to provide a rubber composition having a low compression set, a low hardness, and a high elongation percentage. It is another object of the present invention to provide a conductive rubber roller superior in its wear resistance and does not readily generate wear-caused disadvantages, even though the conductive rubber roller slidingly contacts other members for a long time.

To achieve the object, the present invention provides a semiconductive rubber composition containing copolymerized rubber containing ethylene oxide; chloroprene rubber; and acrylonitrile-butadiene rubber. The present invention also provides a conductive rubber roller having a conductive rubber layer composed of the semiconductive rubber composition on an outermost layer thereof.

The present inventors have found that it is possible to considerably improve the compression set, hardness, and elongation percentage of the semiconductive rubber composition when the semiconductive rubber composition is composed of a mixture of the copolymerized rubber containing the ethylene oxide, a rubber composition containing the chloroprene rubber, and the NBR.

Because the NBR does not contain chlorine therein, the NBR has a lower specific gravity and hardness than the chloroprene rubber. When the chloroprene rubber mixed with the NBR finely disperses, a mixture of the NBR and the chloroprene rubber is mixed with the copolymerized rubber containing the ethylene oxide. As a result, the NBR and the chloroprene rubber disperse each other very finely, although the functional group of the NBR and that of the chloroprene rubber are different from each other. This is because the dissolution parameter of the chloroprene rubber is comparatively close to that of the NBR and because the chloroprene rubber and the NBR do not electrically repel each other. As a result, the finely dispersed chloroprene rubber and the finely dispersed NBR mix with the copolymerized rubber containing the ethylene oxide. In this manner, the three components, namely, the chloroprene rubber, the NBR, and the copolymerized rubber disperse each other very finely. As the effect of the fine dispersion of the three components, the resulting rubber composition is allowed to have a reduced compression set and hardness and an improved elongation percentage. Further the rubber composition is allowed to have an improved wear resistance owing to a synergistic effect to be obtained by the effect of the fine dispersion of the three components and the effect of the reduction of the specific gravity thereof.

As the ethylene oxide-containing copolymerized rubber contained in the semiconductive rubber composition of the present invention, known copolymerized rubbers can be used, provided that they contain the ethylene oxide used to impart conductivity to the semiconductive rubber composition. For example, it is possible to use polyether copolymers or epichlorohydrin copolymers.

As the polyether copolymers, it is possible to use an ethylene oxide-propylene oxide-allyl glycidyl ether copolymer, an ethylene oxide-allyl glycidyl ether copolymer, and an ethylene oxide-propylene oxide copolymer.

As the epichlorohydrin copolymers, it is possible to use an epichlorohydrin-ethylene oxide copolymer, an epichlorohydrin-ethylene oxide-allyl glycidyl ether copolymer, and an epichlorohydrin-ethylene oxide-propylene oxide-allyl glycidyl ether copolymer.

The chloroprene rubber contained in the semiconductive rubber composition of the present invention is obtained by emulsion polymerization of chloroprene. In dependence on the kind of a molecular weight modifier, the chloroprene rubber is classified into a sulfur-modified type and a sulfur-unmodified type.

The chloroprene rubber of the sulfur-modified type is formed by plasticizing a polymer resulting from polymerization of sulfur and the chloroprene with thiuram disulfide or the like so that the resulting chloroprene rubber of the sulfur-modified type has a predetermined Mooney viscosity. The chloroprene rubber of the sulfur-unmodified type includes a mercaptan-modified type and a xanthogen-modified type. Alkyl mercaptans such as n-dodecyl mercaptan, tert-dodecyl mercaptan, and octyl mercaptan are used as a molecular weight modifier for the mercaptan-modified type. Alkyl xanthogen compounds are used as a molecular weight modifier for the xanthogen-modified type.

In dependence on a crystallization speed of generated chloroprene rubber, the chloroprene rubber is classified into an intermediate crystallization speed type, a slow crystallization speed type, and a fast crystallization speed type.

Both the chloroprene rubber of the sulfur-modified type and the sulfur-unmodified type can be used in the present invention. But it is preferable to use the chloroprene rubber of the sulfur-unmodified type having the slow crystallization speed.

In the present invention, as the chloroprene rubber, it is possible to use rubber or elastomer having a structure similar to that of the chloroprene rubber. For example, it is possible to use copolymers obtained by polymerizing a mixture of the chloroprene and at least one monomer copolymerizable with the chloroprene. As monomers copolymerizable with the chloroprene, it is possible exemplify 2,3-dichloro-1,3-butadiene, 1-chloro-1,3-butadiene, sulfur, styrene, acrylonitrile, methacrylonitrile, isoprene, butadiene, acrylic acid, methacrylic acid, and esters thereof.

As the NBR contained in the semiconductive rubber composition of the present invention, it is possible to use any of low-nitrile NBR containing not more than 25% of the acrylonitrile, intermediate-nitrile NBR containing the acrylonitrile in the range of 25 to 31%, intermediate/high nitrile NBR containing the acrylonitrile in the range of 31 to 36%, and high-nitrile NBR containing not less than 36% of the acrylonitrile.

To reduce the specific gravity of the semiconductive rubber composition of the present invention, it is preferable to use the low-nitrile NBR having a small specific gravity. To mix the NBR and the chloroprene rubber with each other favorably, it is preferable to use the intermediate-nitrile NBR or the low-nitrile NBR. More specifically, to make the dissolution parameter of the chloroprene rubber and that of the NBR close to each other, the content of the acrylonitrile in the NBR to be used in the present invention is favorably 15 to 39%, more favorably 17 to 35%, and most favorably 20 to 30%.

It is preferable that the ethylene-oxide containing copolymerized rubber contained in the semiconductive rubber composition of the present invention contains essentially the epichlorohydrin copolymer.

As described above, when the chloroprene rubber mixed with the NBR finely disperses, the mixture of the NBR and the chloroprene rubber is mixed with the copolymerized rubber containing the ethylene oxide. As a result, the NBR and the chloroprene rubber disperse very finely. The use of the epichlorohydrin copolymer as the copolymerized rubber containing the ethylene oxide has an advantage that the chloroprene rubber and the epichlorohydrin copolymer disperse each other finely. This is because the epichlorohydrin copolymer contains chlorine like the chloroprene rubber and the functional group of the epichlorohydrin copolymer is common to that of the chloroprene rubber.

As the epichlorohydrin copolymer, it is possible to use compounds containing essentially the ethylene oxide and the epichlorohydrin. But it is preferable to use the epichlorohydrin copolymer containing the ethylene oxide at not less than 30 mol % nor more than 95 mol %, favorably not less than 55 mol % nor more than 95 mol %, and more favorably not less than 60 mol % nor more than 80 mol %. The ethylene oxide has an action of decreasing the specific volume resistance value of the copolymer. When the ethylene oxide is contained in the copolymer at not more than 30 mol %, the ethylene oxide has decreases the specific volume resistance value of the polymer to a low degree. On the other hand, when ethylene oxide is contained in the copolymer at not less than 95 mol %, the ethylene oxide crystallizes and thus a segment motion of the molecular chain thereof is prevented from taking place. Thereby the specific volume resistance value is liable to rise, the hardness of vulcanized rubber rises, and the viscosity of rubber rises before it is vulcanized.

As the epichlorohydrin copolymer, it is especially preferable to use an epichlorohydrin (EP)-ethylene oxide (EO)-allyl glycidyl ether (AGE) copolymer. As the content ratio among the EO, the EP, and the AGE in the epichlorohydrin copolymer, EO:EP:AGE is favorably 30 to 95 mol %:4.5 to 65 mol %:0 to 10 mol % and more favorably 60 to 80 mol %:15 to 40 mol %:1 to 6 mol %.

As the epichlorohydrin copolymer, it is especially preferable to use an epichlorohydrin (EO)-ethylene oxide (EP) copolymer. As the content ratio between the EO and the EP, EO:EP is favorably 30 to 80 mol %:20 to 70 mol % and more favorably 50 to 80 mol %:20 to 50 mol %.

As the copolymerized rubber containing the ethylene oxide, it is preferable to use the copolymerized rubber consisting of the epichlorohydrin copolymer. But it is possible to use a mixture rubber of the epichlorohydrin copolymer and the copolymerized rubber containing the ethylene oxide. In this case, in view of waterproofness, the mixing amount of the epichlorohydrin copolymer for 100 parts by mass of the rubber component is favorably not less than 50 parts by mass and more favorably not less than 70 parts by mass.

As other rubber components to be combined with the epichlorohydrin copolymer, the polyether copolymer containing the ethylene oxide is favorable, and the ethylene oxide-propylene oxide-allyl glycidyl ether copolymer is more favorable.

It is possible to use only the polyether copolymer as the ethylene oxide-containing copolymerized rubber contained in the semiconductive rubber composition of the present invention.

It is preferable that the polyether copolymer contains 50 to 95 mol % of the ethylene oxide. When the polyether copolymer contains an ethylene oxide unit at a high percentage, it is possible to stabilize much ions and thus allows the semiconductive rubber composition to have a low electric resistance. But when the polyether copolymer contains the ethylene oxide unit at a very high percentage, the ethylene oxide crystallizes and the segment motion of the molecular chain thereof is prevented from taking place. Consequently there is a possibility that the specific volume resistance value of the copolymer rises.

It is preferable that the polyether copolymer contains the allyl glycidyl ether. By copolymerizing the allyl glycidyl ether with the ethylene oxide or the like, the allyl glycidyl ether unit obtains a free volume as a side chain. Thus the crystallization of the ethylene oxide is suppressed. As a result, the semiconductive rubber composition has a lower electric resistance than conventional semiconductive rubber compositions. By copolymerizing the allyl glycidyl ether with the ethylene oxide or the like, carbon-to-carbon double bonds are introduced into the copolymer, it is possible to crosslink it with other rubbers. Thereby the polyether copolymer containing the allyl glycidyl ether contributes to the prevention of bleeding and the contamination of an electrophotographic photoreceptor.

It is preferable that the polyether copolymer contains 1 to 10 mol % of the allyl glycidyl ether. When the polyether copolymer contains less than one mol % of the allyl glycidyl ether, bleeding and contamination of an electrophotographic photoreceptor are liable to occur. On the other hand, when the polyether copolymer contains more than 10 mol % of the allyl glycidyl ether, it is impossible to enhance the effect of suppressing crystallization, and the number of crosslinked points increases after vulcanization. Thus it is impossible to allow the semiconductive rubber composition to have a low electric resistance value. In addition, the tensile strength, fatigue characteristic, and flexing resistance of the semiconductive rubber composition deteriorate.

As the polyether copolymer to be used in the present invention, it is preferable to use an ethylene oxide (EO)-propylene oxide (PO)-allyl glycidyl ether (AGE) terpolymer. By copolymerizing the propylene oxide with the ethylene oxide and the propylene oxide, it is possible to suppress crystallization of the ethylene oxide to a higher extent. A preferable content ratio among the ethylene oxide (Eo), the propylene oxide (PO), and the allyl glycidyl ether (AGE) in the polyether copolymer is EO:PO:AGE=50 to 95 mol %:1 to 49 mol %:1 to 10 mol %. To effectively prevent bleeding from occurring and the electrophotographic photoreceptor from being contaminated, it is preferable that the number-average molecular weight Mn of the ethylene oxide (EO)-propylene oxide (PO)-allyl glycidyl ether (AGE) terpolymer is not less than 10,000.

The rate of each rubber component of the semiconductive rubber composition of the present invention is not specifically limited, but may be appropriately selected. By altering the mixing ratio between the chloroprene rubber and the NBR, it is possible to impart a proper electrification amount to toner which is negatively charged and toner which is positively charged.

It is possible to preferably use the semiconductive rubber composition as a conductive rubber member of an image-forming mechanism in which an unmagnetic one-component toner which is negatively charged is used, when the content of the ethylene oxide contained in the copolymerized rubber is less than that of the acrylonitrile-butadiene rubber and when the content of the chloroprene rubber is less than that of the acrylonitrile-butadiene rubber.

More specifically, it is favorable that the mixing amount of the copolymerized rubber containing the ethylene oxide is not less than five parts by mass for 100 parts by mass of the rubber component to disperse the chloroprene rubber and the NBR. To allow the semiconductive rubber composition to be ionic-conductive, it is more favorable that the mixing amount of the copolymerized rubber containing the ethylene oxide is not less than 15 parts by mass for 100 parts by mass of the rubber component.

To favorably disperse the NBR when it is mixed with the chloroprene rubber, it is favorable that the mixing amount of the NBR is not less than five parts by mass for 100 parts by mass of the rubber component. To improve the elongation percentage of the semiconductive rubber composition of the present invention, the mixing amount of the NBR is more favorably not less than 10 parts by mass, and most favorably not less than 20 parts by mass for 100 parts by mass of the rubber component. As the upper limit value of the mixing amount of the NBR, to reduce the compression set, it is favorable to use not more than 65 parts by mass of the NBR and more favorable to use not more than 50 parts by mass for 100 parts by mass of the rubber component.

To favorably disperse the chloroprene rubber when it is mixed with the NBR, the mixing amount of the chloroprene rubber for 100 parts by mass of the rubber component is favorably not less than five parts by mass. To keep a favorable balance among various properties of the semiconductive rubber composition, the mixing amount of the chloroprene rubber for 100 parts by mass of the rubber component is favorably in the range of 5 to 75 parts by mass, and more favorably in the range of 10 to 65 parts by mass, and most favorably in the range of 10 to 40 parts by mass.

The semiconductive rubber composition of the present invention is ionic-conductive. Thereby the semiconductive rubber composition provides a uniform electrical characteristic.

By adjusting the mixing amount of the copolymerized rubber containing the ethylene oxide, the semiconductive rubber composition is allowed to be ionic-conductive. Instead, an ionic-conductive agent may be added to the rubber component. Various ionic-conductive agents can be selected. For example, it is possible to use anion-containing salts having a fluoro group and a sulfonyl group. More specifically, it is possible to use a salt of bisfluoroalkylsulfonylimide, a salt of tris (fluoroalkylsulfonyl)methane, and a salt of fluoroalkylsulfonic acid. As cations of the above-described salts making a pair with the anions, metal ions of the alkali metals, the group 2A metals, and other metals are favorable. A lithium ion is more favorable. As the anion-containing salt having the fluoro group and the sulfonyl group, it is possible to use $LiCF_9SO_3$, $LiN(SO_2CF_3)_2$, $LiC(SO_2CF_3)$, $LiCH(SO_2CF_3)_2$, and $LiSF_6CF_2SO_3$.

The mixing amount of the ionic-conductive agent can be appropriately selected in dependence on the kind thereof. For example, it is preferable that the mixing amount of the ionic-conductive agent is 0.1 to 5 parts by mass for 100 parts by mass of the rubber component.

An electro-conductive agent may be added to the rubber component as desired to allow the semiconductive rubber composition to be electronic-conductive. As the electro-conductive agent, it is possible to use conductive carbon black such as Ketchen black, furnace black, acetylene black; conductive metal oxides such as zinc oxide, potassium titanate, antimony-doped titanium oxide, tin oxide, and graphite; and carbon fiber. The mixing amount of the electro-conductive agent is appropriately selected in consideration of properties such as the electric resistance value of the semiconductive rubber composition. For example, the mixing amount of the electro-conductive agent is 5 to 20 parts by mass for 100 parts by mass of the rubber component.

The semiconductive rubber composition of the present invention is capable of containing components other than the above-described rubber components so long as the addition thereof to the rubber components is not contradictory to the object of the present invention.

It is preferable to mix weakly conductive carbon black with the rubber components to reduce the dielectric loss tangent of a conductive rubber roller composed of the semiconductive rubber composition of the present invention.

The weakly conductive carbon black is large in its particle diameter, has a low extent of development in its structure, and has a small degree of contribution to the conductivity of the semiconductive rubber composition. The semiconductive rubber composition containing the weakly conductive carbon black is capable of obtaining a capacitor-like operation owing to a polarizing action without increasing the conductivity thereof and controlling the electrostatic property of the semiconductive rubber composition without deteriorating the uniformity of the electric resistance thereof.

It is possible to effectively obtain the above-described effect by using the weakly conductive carbon black whose primary particle diameter is not less than 80 nm and preferably not less than 100 nm. When the primary particle diameter is not more than 500 nm and preferably not more than 250 nm, it is possible to remarkably reduce the degree of the surface roughness of the semiconductive rubber composition. It is preferable that the weakly conductive carbon black is spherical or has a configuration similar to the spherical shape because the weakly conductive carbon black has a small surface area.

Various weakly conductive carbon blacks can be selected. For example, it is favorable to use carbon black produced by a furnace method or a thermal method providing particles having large diameters. It is more favorable to use the carbon black produced by the furnace method. SRF carbon, FT carbon, and MT carbon are preferable in terms of the classification of carbon. The carbon black for use in pigment may be used.

It is preferable to use not less than five parts by mass of the weakly conductive carbon black for 100 parts by mass of the rubber component so that the weakly conductive carbon black substantially displays the effect of reducing the dielectric loss tangent of the semiconductive rubber composition. It is preferable to use not more than 70 parts by mass of the weakly conductive carbon black for 100 parts by mass of the rubber component to prevent an increase of the hardness of the semiconductive rubber composition so that the conductive rubber roller composed of the semiconductive rubber composition does not damage other members which contact the conductive rubber roller and prevent a decrease of the wear resistance thereof. It is preferable that the mixing amount of the weakly conductive carbon black is not more than 70 parts by mass for 100 parts by mass of the rubber component to allow the conductive rubber roller to have a small voltage fluctuation for a voltage applied thereto, namely, to allow the conductive rubber roller to be ionic-conductive.

It is possible to reduce the dielectric loss tangent of the conductive rubber roller by adding calcium carbonate treated with fatty acid to the rubber component instead of the weakly conductive carbon black. The calcium carbonate treated with fatty acid is more active than ordinary calcium carbonate and is lubricant because the fatty acid is present on the interface of the calcium carbonate. Thus a high degree of the dispersion of the calcium carbonate treated with the fatty acid can be realized easily and reliably. When the polarization action is accelerated by the treatment of the calcium carbonate with the fatty acid, there is an increase in the capacitor-like operation in the rubber owing to the above-described two actions. Thus the dielectric loss tangent of the semiconductive rubber composition can be efficiently reduced. It is preferable that the surfaces of particles of the calcium carbonate treated with fatty acid are entirely coated with fatty acid such as stearic acid. The mixing amount of the calcium carbonate treated with fatty acid is 30 to 80 parts by mass and favorably 40 to 70 for 100 parts by mass of the rubber component. It is preferable that the mixing amount of the calcium carbonate treated with fatty acid is not less than 30 parts by mass for 100 parts by mass of the rubber component so that it substantially display the effect of reducing the dielectric loss tangent of the semiconductive rubber composition. To prevent the rise of the hardness of the semiconductive rubber composition and the fluctuation of the electric resistance thereof, it is preferable that the mixing amount of the calcium carbonate treated with fatty acid is not more than 80 parts by mass for 100 parts by mass of the rubber component.

The semiconductive rubber composition of the present invention contains a vulcanizing agent for vulcanizing the above-described rubber component.

As the vulcanizing agent, it is possible to use a sulfur-based vulcanizing agent, a thiourea-based vulcanizing agent, triazine derivatives, peroxides, and monomers. These vulcanizing agents can be used singly or in combination of two or more of them. As the sulfur-based vulcanizing agent, it is possible to use powdered sulfur, organic sulfur-containing compounds such as tetramethylthiuram disulfide, N,N-dithiobismorpholine, and the like. As the thiourea-based vulcanizing agent, it is possible to use tetramethylthiourea, trimethylthiourea, ethylenethiourea, and thioureas shown by $(C_nH_{2n+1}NH)_2C{=}S$ (n=integers 1 to 10). As the peroxides, benzoyl peroxide is exemplified.

The mixing amount of the vulcanizing agent for 100 parts by mass of the rubber component is favorably not less than 0.2 parts by mass nor more than five parts by mass and more favorably not less than one part by mass nor more than three parts by mass.

In the present invention, it is preferable to use sulfur and thioureas in combination as the vulcanizing agent. The use of epichlorohydrin rubber not containing the AGF allows the compression set of the semiconductive rubber composition to be greatly reduced. Thus the vulcanizing agent containing the sulfur and the thioureas is most favorable.

The mixing amount of the sulfur for 100 parts by mass of the rubber component is favorably not less than 0.1 parts by mass nor more than 5.0 parts by mass and more favorably not less than 0.2 parts by mass nor more than 2 parts by mass. When the mixing amount of the sulfur for 100 parts by mass of the rubber component is less than 0.1 parts by mass, the vulcanizing speed of the entire rubber composition is slow and thus the productivity thereof is low. On the other hand, when the mixing amount of the sulfur for 100 parts by mass of the rubber component is more than 5.0 parts by mass, there is a possibility that the compression set of the rubber composition is high and the sulfur and an accelerating agent bloom.

The mixing amount of the thioureas for 100 g of the rubber component is favorably not less than 0.0009 mol nor more than 0.0800 mol and more favorably not less than 0.0015 mol nor more than 0.0400 mol. By mixing the thioureas with the rubber component in the above-described range, blooming and the contamination of the electrophotographic photoreceptor hardly occur, and further the molecular motion of the rubber is hardly prevented. Thus the rubber composition is allowed to have high performance. That is, the rubber composition has a low electric resistance value and excellent mechanical properties such as a low compression set. As the addition amount of the thioureas is increased to increase the crosslinking density, the electric resistance value of the rubber composition can be decreased. When the mixing amount of the thioureas for 100 g of the rubber component is less than 0.0009 mol, it is difficult to improve the compression set of the rubber composition and decrease the electric resistance value thereof. On the other hand, when the mixing amount of the thioureas for 100 g of the rubber component is more than 0.0800 mol, the thioureas bloom from the surface of the rubber composition, thus contaminating the electrophotographic photoreceptor and deteriorating the mechanical properties of the rubber composition such as the breaking extension thereof.

In dependence on the kind of the vulcanizing agent, a vulcanizing accelerating agent or a vulcanizing accelerating assistant agent may be mixed with the rubber component.

As the vulcanizing accelerating agent, it is possible to use inorganic accelerating agents such as slaked lime, magnesia (MgO), and litharge (PbO); and organic accelerating agents shown below. The organic accelerating agent includes guanidines such as di-ortho-tolylguanidine, 1,3-diphenyl guanidine, 1-ortho-tolylbiguanide, salts of the di-ortho-tolylguanidine of dicatechol borate; thiazoles such as 2-melcapto.benzothiazole, dibenzothiazyl disulfide; sulfenamides such as N-cyclohexyl-2-benzothiazolyl sulfenamide; thiurams such as tetramethylthiuram monosulfide, tetramethylthiuram disulfide, tetraethylthiuram disulfide, and dipentamethylenethiuram tetrasulfide; and thioureas. It is possible to use the above-described substances singly or in combination.

The mixing amount of the vulcanizing accelerating agent is favorably not less than 0.5 nor more than five parts by mass and more favorably not less than 0.5 nor more than two parts by mass for 100 parts by mass of the rubber component.

The following vulcanizing accelerating assistants can be used: metal oxides such as zinc white; fatty acids such as stearic acid, oleic acid, cotton seed fatty acid, and the like; and known vulcanizing accelerating assistants.

The addition amount of the vulcanizing accelerating agent for 100 parts by mass of the rubber component is favorably not less than 0.5 parts by mass nor more than 10 parts by mass and more favorably not less than two parts by mass nor more than eight parts by mass.

In addition to the above-described components, the conductive rubber roller may contain the following additives unless the use thereof is not contradictory to the object of the present invention: a plasticizing agent, a processing aid, a deterioration retarder, a filler, a scorch retarder, an ultraviolet ray absorber, a lubricant, a pigment, an antistatic agent, a fire retardant, a neutralizer, a core-forming agent, a foam prevention agent, and a crosslinking agent.

As the plasticizer, it is possible to use dibutyl phthalate (DBP), dioctyl phthalate (DOP), tricresyl phosphate, and wax. As the processing aid, fatty acids such as stearic acid can be used. It is preferable that the mixing amounts of these plasticizing components are not more than five parts by mass for 100 parts by mass of the rubber component to prevent bleeding from occurring when the oxide film is formed on the surface of the semiconductive rubber composition and the electrophotographic photoreceptor from being contaminated when the conductive rubber roller is mounted on a printer and the like and when the printer or the like is operated. In this respect, polar wax is most favorably used as the plasticizer.

As the deterioration retarder, various age resistors and antioxidants can be used. When the antioxidant is used as the deterioration retarder, it is preferable to appropriately select the mixing amount thereof to efficiently form the oxide film on the surface of the semiconductive rubber composition as desired.

The following fillers can be used: powdered substances such as zinc oxide, silica, carbon, carbon black, clay, talc, calcium carbonate, magnesium carbonate, aluminum hydroxide, and alumina. The rubber composition containing the filler is allowed to have an improved mechanical strength and the like. The conductive rubber roller composed of the rubber composition containing alumina or titanium oxide has a high thermal conductivity. Thus it is possible to release heat generated at the sealing portion of the conductive rubber roller and thus improve the wear resistance thereof.

The mixing amount of the filler for 100 parts by mass of the rubber component is favorably not more than 60 parts by mass and more favorably not more than 50 parts by mass. The weakly conductive carbon black serves as the filler in addition to the above-described role thereof.

As the scorch retarder, it is possible to use N-(cyclohexylthio)phthalimide; phthalic anhydride, N-nitrosodiphenylamine, 2,4-diphenyl-4-methyl-1-pentene. It is preferable to use the N-(cyclohexylthio)phthalimide. These scorch retarders can be used singly or in combination. The mixing amount of the scorch retarder for 100 parts by mass of the rubber component is favorably not less than 0.1 nor more than 5 parts by mass and more favorably not less than 0.1 parts by mass nor more than 1 part by weight.

When semiconductive rubber composition of the present invention contains the epichlorohydrin copolymer, it is preferable that the semiconductive rubber composition contains an acid-accepting agent. By using the semiconductive rubber composition containing the acid-accepting agent, it is possible to prevent chlorine gas generated in a vulcanizing operation from remaining behind and the electrophotographic photoreceptor from being contaminated.

As the acid-accepting agent, it is possible to use various substances acting as acid acceptors. As the acid-accepting agent, hydrotalcites or magsarat can be favorably used because they have preferable dispersibility. The hydrotalcites are especially favorable. It is possible to obtain a high acid-accepting effect by using the hydrotalcites in combination with magnesium oxide or potassium oxide. Thereby it is possible to securely prevent the electrophotographic photoreceptor from being contaminated.

The mixing amount of the acid-accepting agent for 100 parts by mass of the rubber component is favorably not less than 1 nor more than 10 parts by mass and more favorably not less than 1 nor more than 5 parts by mass. The mixing amount of the acid-accepting agent for 100 parts by mass of the rubber component is favorably not less than one part by weight to allow the acid-accepting agent to effectively display the effect of preventing a vulcanizing operation from being inhibited and the electrophotographic photoreceptor from being contaminated. The mixing amount of the acid-accepting agent for 100 parts by mass of the rubber component is favorably not more than 10 parts by mass to prevent the hardness of the semiconductive rubber composition from increasing.

The semiconductive rubber composition of the present invention has a low compression set, a low hardness, and a high elongation percentage in a favorable balance.

The semiconductive rubber composition of the present invention has a compression set of not more than 10% and more favorably not more than 9.5% when the compression set is measured in accordance with the method specified in JIS K6262. When the compression set is not more than 10%, a roller or a belt composed of the semiconductive rubber composition has a small dimensional change and is durable. Thereby the roller or the belt allows an image-forming apparatus to maintain a high accuracy for a long time. It is favorable that the compression set of the semiconductive rubber composition is not less than 1% to optimize a vulcanizing condition and mass-produce the semiconductive rubber composition stably.

As the condition of measuring the compression set, the temperature, the period of time, and the compression percentage are set to 70° C., 24 hours, and 25% respectively.

The semiconductive rubber composition of the present invention has a hardness not more than 70 degrees, favorably not more than 63 degrees, when the hardness thereof is measured by a durometer of test type A specified in JIS K 6253. This is because the softer the conductive rubber roller, the larger the nip. Thereby it is possible to accomplish transfer, charging, and development efficiently and in addition, reduce mechanical damage to other members such as the electrophotographic photoreceptor. It is preferable that the conductive rubber roller is soft. But the lower limit of the hardness of the semiconductive rubber composition is favorably not less than 40 degrees and more favorably not less than 50 degrees in view of wear resistance.

The maximum elongation of the semiconductive rubber composition of the present invention is favorably not less than 230% and favorably not less than 260%. As the maximum elongation becomes larger, the semiconductive rubber composition becomes increasingly resistant to destruction and wear.

It is preferable that the semiconductive rubber composition of the present invention has a Mooney viscosity (central value) specified in JIS K 6300-1 is not more than 85. By setting the Mooney viscosity to not more than 85, the semiconductive rubber composition has improved kneading processability and moldability. Thus the semiconductive rubber composition has an improved dimensional accuracy and property of the surface thereof. It is preferable that the Mooney viscosity (central value) is not less than 20 in view of stability after the semiconductive rubber composition is molded. When processing accuracy is considered, the Mooney viscosity (central value) is favorably in the range of 30 to 80 and more favorably in the range of 40 to 70.

The rubber composition of the present invention is semiconductive. The specific volume resistance value of the semiconductive rubber composition is favorably $10^{5.5}$ Ω·cm nor more than $10^{9.0}$ Ω·cm and more favorably $10^{7.0}$ Ω·cm nor more than $10^{8.0}$ Ω·cm. When the specific volume resistance value is less than $10^{5.5}$ Ω·cm, a rubber member composed of the rubber composition of the present invention cannot be provided with a proper conductivity. On the other hand, when the specific volume resistance value of the semiconductive rubber composition is more than $10^{9.0}$ Ω·cm, excessive electrification amount is applied to toner, and the voltage drops greatly when toner separates from the surface of the rubber member. Thereby there is a possibility that the system operates unstably. Further in a roller and a belt composed of the rubber composition, a transfer operation, a charging operation, and a toner supply operation are performed at a low efficiency. Thus the roller and the belt are unsuitable for practical use. The specific volume resistance value is measured at a constant temperature of 23° C. and a constant humidity of 55%, and an applied voltage of 200.

The semiconductive rubber composition of the present invention is roller-shaped or belt-shaped by molding it so that it is used as conductive rubber members for use in an image-forming apparatus.

As the conductive rubber member of the present invention, the conductive rubber roller having a conductive rubber layer composed of the semiconductive rubber composition of the present invention on the outermost layer thereof is exemplified. The construction of the conductive rubber roller is not specifically limited, provided that the conductive rubber roller has the conductive rubber layer composed of the semiconductive rubber composition of the present invention on the outermost layer thereof. The conductive rubber roller may have a multi-layer construction such as a two-layer construction in dependence on demanded performance. But it is preferable that the conductive rubber roller has a one-layer construction because the conductive rubber roller having the one-layer construction has little variations in the properties thereof and can be manufactured at a low cost.

It is preferable that the surface of the outermost conductive rubber layer is formed as an oxide film having a low friction coefficient by irradiating the surface of the outermost conductive rubber layer with ultraviolet rays and/or ozone. Thereby toner separates easily from the outermost conductive rubber layer. Hence images can be formed easily. Consequently images of high quality can be obtained.

It is preferable that the oxide film has a large number of C═O groups or C—O groups. As described above, the oxide film is formed by irradiating the surface of the conductive rubber layer with ultraviolet rays and/or ozone and oxidizing the surface of the conductive rubber layer. It is preferable to form the oxide film by irradiating the surface of the conductive rubber layer with ultraviolet rays because the use of the ultraviolet rays allows a treating period of time to be short and the oxide film-forming cost to be low.

The treatment for forming the oxide film can be made in accordance with a known method. For example, the surface of the conductive rubber layer is irradiated with ultraviolet rays having a wavelength of 100 nm to 400 nm and favorably 100 nm to 300 nm for 30 seconds to 30 minutes and favorably one to 10 minutes while the conductive rubber roller is rotating, according to the distance between the surface of the rubber roller and an ultraviolet ray irradiation lamp and the kind of rubber. It is preferable to give the energy 500 to 4000 $mJ/cm^2$.

It is possible to stably form the oxide film and reduce the energy required to form the oxide film by using the semiconductive rubber composition of the present invention. Thereby production efficiency can be improved. Therefore the ultraviolet ray irradiation period of time is preferably three to eight minutes when ultraviolet rays having the wavelength of 100 to 400 nm is used.

Supposing that the electric resistance of the conductive rubber roller is R50 when a voltage of 50V is applied thereto before the oxide film is formed thereon and that the electric resistance thereof is R50a when the voltage of 50V is applied thereto after the oxide film is formed thereon, it is favorable that $\log(R50a)-\log(R50)=0.2$ to 1.5. By setting the electric resistance of the conductive rubber roller to the above-described range, it is possible to provide the conductive rubber roller with improved durability, reduce the variation of the electric resistance when it is in operation, reduce a stress on toner, and prevent the electrophotographic photoreceptor from being contaminated or damaged. Because the index value of the electric resistance value of the conductive rubber roller is set to a low voltage of 50 volts at which a voltage is stably applied thereto, it is possible to capture a slight rise of the electric resistance caused by the formation of the oxide film. The lower limit value of $\log(R50a)-\log(R50)$ is more favorably 0.3 and most favorably 0.5. The upper limit value of $\log(R50a)-\log(R50)$ is more favorably 1.2 and most favorably 1.0.

It is preferable that the friction coefficient of the surface of the conductive rubber roller is favorably in the range of 0.1 to 1.0, more favorably in the range of 0.1 to 0.8, and most favorably in the range of 0.1 to 0.6. In this range, it is possible to improve the chargeability of toner and prevent the toner from sticking to the surface of the conductive rubber layer. If the friction coefficient of the surface of the conductive rubber layer is more than 1.0, a large stress such as a large shearing force is applied to the toner. Further a portion of the semiconductive rubber roller making a sliding contact with a member of an image-forming apparatus has a high calorific value and a large amount of wear owing to friction therebetween. On the other hand, if the friction coefficient of the surface of the conductive rubber layer is less than 0.1, the toner slips and hence it is difficult to transport a sufficient amount of toner and charge the toner sufficiently.

The surface roughness Rz of the conductive rubber roller is favorably not more than 8 μm and more favorably not more than 5 μm. By setting the surface roughness Rz of the conductive rubber roller to the above-described range, the diameters of irregularities of the surface thereof are smaller than those of toner particles. Thus the toner can be transported uniformly, and the flowability of the toner is favorable. Consequently it is possible to efficiently electrically charge the toner. It is preferable that the surface roughness Rz is low but is normally not less than 1 μm. The surface roughness Rz is measured in conformity to JIS B 0601 (1994).

It is preferable that the dielectric loss tangent of the conductive rubber roller of the present invention is in the range of 0.1 to 1.5 when an alternating voltage of 5V is applied thereto at a frequency of 100 Hz. In the electrical characteristics of the rubber roller, the dielectric loss tangent means an index indicating the flowability of electricity (conductivity) and the degree of influence of a capacitor component (electrostatic capacity). In other words, the dielectric loss tangent is a parameter indicating a phase delay when an alternating current is applied to the conductive rubber roller, namely, the rate of the capacitor component when a voltage is applied thereto. When the dielectric loss tangent is large, it is easy to energize (electric charge) the rubber roller, which makes the progress of polarization slow. On the other hand, when the dielectric loss tangent is small, it is not easy to energize the rubber roller, which makes the progress of the polarization fast. By setting the dielectric loss tangent to the above-described range of 0.1 to 1.5, the polarization of the conductive rubber roller can be set to an optimum range. Thus it is possible to impart electrostatic property to toner without deteriorating the uniformity of the electric resistance of the conductive rubber roller and maintain the electrostatic property imparted thereto. It is difficult to realize the dielectric loss tangent less than 0.1 by ionic conduction. If the loss tangent is more than 1.5, it is impossible to provide the conductive rubber roller with the above-described preferable electrostatic property.

It is favorable that the electric resistance value of the conductive rubber roller is favorably in the range of $10^5$ to $10^8 \Omega$ and more favorably in the range of $10^{5.5}$ to $10^7 \Omega$, when a voltage of 500 volts is applied thereto.

It is favorable that the electric resistance value of the conductive rubber roller is not less than $10^5 \Omega$ so that the generation of a low-quality image is suppressed and electrical discharge to the electrophotographic photoreceptor is prevented by controlling electric current flowing therethrough. It is favorable that the electric resistance value of the conductive rubber roller is not more than $10^8\Omega$ to keep efficient toner supply and prevent the generation of the low-quality image because the toner cannot be transported to the electrophotographic photoreceptor securely from the developing roller as a result of a voltage drop of the developing roller when the toner moves to the electrophotographic photoreceptor. When the electric resistance value of the conductive rubber roller is not more than $10^7\Omega$, it can be used in various conditions.

It is preferable that the following relationship establishes between the electric resistance R100 of the conductive rubber roller in the application of 100V and the electric resistance R500 thereof in the application of 500V:

$$\log R100 - \log R500 < 0.5$$

By specifying the difference between the electric resistance value of conductive rubber roller in the application of 100V and the reference electric resistance value in the application of 500V close to a developing bias, it is possible to make the electrical characteristic thereof such as the electric resistance thereof uniform. It is favorable that the conductive rubber roller is ionic-conductive because the ionic-conductive conductive rubber roller depends on a voltage to a low extent. In the case where the conductive rubber roller containing ordinary carbon black is dependent on electronic conduction, the value of (log R100−log R500) is not less than 1.

It is preferable that the conductive rubber roller of the present invention is used for an image-forming mechanism of an electrophotographic apparatus of office automation appliances such as a laser beam printer, an ink jet printer, a copying machine, a facsimile, and the like or an ATM.

Above all, the conductive rubber roller of the present invention is preferably used as a developing roller for transporting unmagnetic one-component toner to the electrophotographic photoreceptor. Roughly classifying the developing method used in the image-forming mechanism of the electrophotographic apparatus in the relation between the electrophotographic photoreceptor and the developing roller, the contact type and the non-contact type are known. The conductive rubber roller of the present invention can be utilized in both types. It is preferable that the developing roller of the present invention substantially contacts the electrophotographic photoreceptor.

In addition to the developing roller, the conductive rubber roller of the present invention can be used as a charging roller for uniformly charging the electrophotographic drum, a transfer roller for transferring a toner image from the electrophotographic photoreceptor to a transfer belt and paper, a toner supply roller for transporting toner, and a driving roller for driving the transfer belt from the inner side thereof.

In the semiconductive rubber composition of the present invention, because the copolymerized rubber containing the ethylene oxide, the chloroprene rubber, and the NBR disperse very finely, the semiconductive rubber composition has a low compression set, a low hardness, and a high elongation percentage in a favorable balance and thus an improved wear resistance. Thereby even though the conductive rubber roller composed of the semiconductive rubber composition of the present invention is in sliding contact with other members, a wear-caused disadvantage hardly occurs for a long time. For example, the developing roller composed of the semiconductive rubber composition of the present invention hardly gives rise to leak of toner owing to wear caused by friction between it and a sealing portion of a toner cartridge.

The conductive rubber roller composed of the semiconductive rubber composition of the present invention is allowed to have uniform electrical and charging characteristics. When a rubber composition contains a plurality of mixed rubber components, the mixing ratio of a filler is different according to the kind of the rubber components. Thus it is difficult to make the electrical characteristic uniform of the semiconductive rubber composition. When a conventional semiconductive rubber composition contains a dielectric loss tangent-adjusting agent such as weakly conductive carbon black or calcium carbonate treated with fatty acid, developing roller composed of the conventional semiconductive rubber composition has variations in not only its mechanical properties but also in its charging property. But the developing roller composed of the semiconductive rubber composition of the present invention does not have such variations.

The NBR contained in the semiconductive rubber composition of the present invention is easily oxidized. Thus it is easy to form the oxide film on the surface of the semiconductive rubber roller having the conductive rubber layer composed of the semiconductive rubber composition of the present invention on its outermost layer. Consequently it is possible to reduce the energy required to form the oxide film and improve the production efficiency. In addition, the NBR mixes and finely disperses with the copolymerized rubber containing the ethylene oxide. Thus even when the NBR is oxidized excessively, the mixture of the rubber components is capable of maintaining a high mechanical strength. That is, the oxide film can be easily formed on the surface of the semiconductive rubber composition of the present invention. Further the semiconductive rubber composition is less subject to deterioration than the conventional semiconductive rubber composition.

In the semiconductive rubber composition of the present invention, by altering the ratio between the chloroprene and the NBR, it is possible to control the positive/negative electrical chargeability in a wide range. Consequently the developing roller composed of the semiconductive rubber composition of the present invention is capable of applying a proper electrification amount to toner which is negatively charged and toner which is positively charged.

DETAILED DESCRIPTION OF THE PREFERRED EMBODIMENTS

Figure 1:
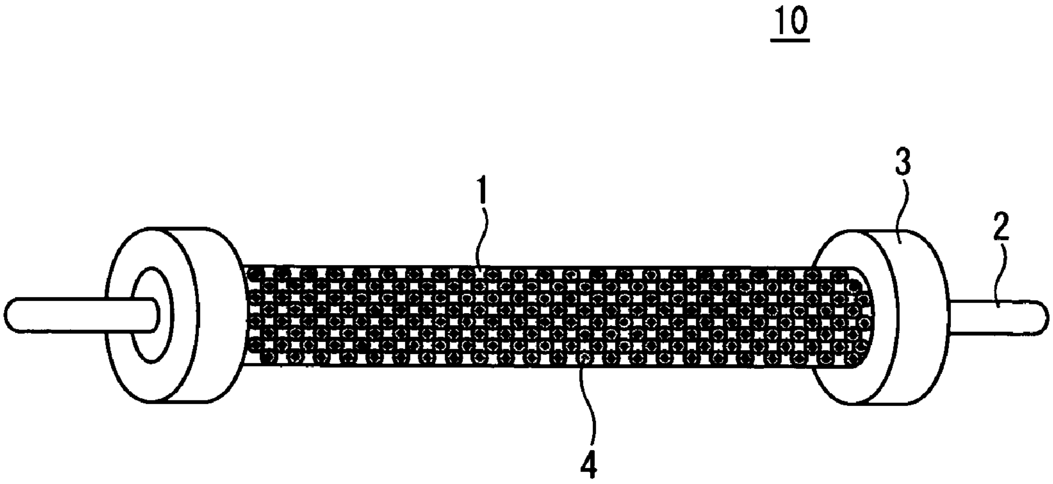
FIG. 1 is a schematic view showing a developing roller which is one mode of the conductive rubber roller composed of the semiconductive rubber composition of the present invention.

The embodiments of the present invention will be described below with reference to drawings.

The semiconductive rubber composition of the present invention contains the epichlorohydrin rubber or the polyether copolymer as the copolymerized rubber containing the ethylene oxide, the chloroprene rubber, and the NBR.

As the epichlorohydrin rubber, the ethylene oxide-epichlorohydrin-allyl glycidyl ether terpolymer or the ethylene oxide-epichlorohydrin bipolymer is used. The content ratio among the ethylene oxide, the epichlorohydrin, and the allyl glycidyl ether of the terpolymer is 60 to 80 mol %:15 to 40 mol %:1 to 6 mol %. The content ratio between the ethylene oxide and the epichlorohydrin is 50 to 70 mol %:30 to 50 mol %.

As the polyether copolymer, the ethylene oxide-propylene oxide-allyl glycidyl ether terpolymer is used. The content ratio among the ethylene oxide, the propylene oxide, and the allyl glycidyl ether is 80 to 95 mol %:1 to 10 mol %:1 to 10 mol %. The number-average molecular weight Mn of the copolymer is favorably not less than 10,000, more favorably not less than 30,000, and most favorably not less than 50,000.

Chloroprene rubber not containing sulfur is used.

As the NBR, the low-nitrile NBR containing the acrylonitrile at not more than 25% is used.

When the epichlorohydrin rubber is used as the copolymerized rubber containing the ethylene oxide, the content of the epichlorohydrin rubber, that of the chloroprene rubber, and that of the NBR for 100 parts by mass which is the total mass of the rubber components are 30 to 50 parts by mass, 5 to 40 parts by mass, and 10 to 65 parts by mass respectively.

When the polyether copolymer is used as the copolymerized rubber containing the ethylene oxide, the content of the polyether copolymer, that of the chloroprene rubber, and that of the NBR for 100 parts by mass which is the total mass of the rubber components are 10 to 20 parts by mass, 10 to 75 parts by mass, and 10 to 75 parts by mass respectively.

The semiconductive rubber composition of the present invention contains the weakly conductive carbon black, the filler, the acid-accepting agent, and the vulcanizing agent in addition to the rubber components.

The weakly conductive carbon black which has an average primary particle diameter of 100 to 250 nm and is spherical or has a configuration similar to the spherical shape is used. It is preferable that the mixing amount of the weakly conductive carbon black for 100 parts by mass of the rubber component is 20 to 70 parts by mass. By adding the above-described amount of the weakly conductive carbon black to the rubber component, it is possible to reduce the dielectric loss tangent of the conductive rubber roller of the present invention. Further it is possible to reduce a tacky feeling of the surface of the conductive rubber roller and separate toner therefrom easily.

As the filler, zinc oxide is used. The above-described weakly conductive carbon black serves as the filler. The addition amount of the filler for 100 parts by weight of the rubber component is favorably 30 to 70 parts by weight and more favorably 30 to 50 parts by weight.

As the acid-accepting agent, hydrotalcites is used. The mixing amount of the acid-accepting agent is not more than 1 to 5 parts by mass for 100 parts by mass of the rubber component.

As the vulcanizing agent, sulfur and ethylene thiourea are used in combination. The mixing amount of the vulcanizing agent for 100 parts by weight of the rubber component is set to not less than one part by mass nor more than three parts by weight. The weight ratio between the sulfur and the ethylene thiourea (sulfur:ethylene thiourea)=favorably 1:0.2 to 8 and more favorably 1:1.5 to 4.

The method of manufacturing the semiconductive rubber composition of the present invention is not specifically limited. By using a known kneading apparatus such as a Banbury mixer, a kneader, an open roll and the like, components of the semiconductive rubber composition are mixed with one another into the shape of a sheet or a ribbon so that the a kneaded material can be molded easily at a molding step. The temperature in a kneading operation and the kneading period of time are appropriately selected. The order of mixing the components is not specifically limited. All the components may be mixed one another. Alternatively, after a part of the components may be mixed one another to form a kneaded material, remaining components may be mixed with the kneaded material.

More specifically, after the components are supplied to the kneader in the order of the rubber component, the weakly conductive carbon black, and the zinc oxide, these components are kneaded at a discharge temperature of 80 to 150° C. The vulcanizing agent, the acid-accepting agent, and other desired additives are added to the obtained kneaded material. Thereafter all the components are kneaded by using a roll for 1 to 30 minutes, preferably 1 to 15 minutes to obtain a sheet-shaped or ribbon-shaped compound.

The semiconductive rubber composition of the present invention has a low compression set, a low hardness, and a high elongation percentage in a favorable balance.

The semiconductive rubber composition of the present invention had a compression set of 1 to 9.5% which was measured at a temperature of 70° C. for 24 hours at a compression rate of 25% in accordance with "Permanent set testing methods for rubber, valcanized or thermoplastic".

The semiconductive rubber composition of the present invention has a hardness 50 to 63 degrees when the hardness thereof was measured by using a durometer of hardness test type A specified in JIS K6253.

The semiconductive rubber composition of the present invention had a maximum elongation of 260 to 400%.

The semiconductive rubber composition of the present invention formed by the above-described method is molded into desired configurations to obtain conductive rubber members.

As one of the embodiments of the present invention, FIG. 1 shows a developing roller for transporting unmagnetic one-component toner to an electrophotographic photoreceptor.

A developing roller 10 shown in FIG. 1 has a cylindrical roller 1 having a thickness of 0.5 mm to 15 mm, preferably 3 to 10 mm, a columnar metal shaft 2 inserted into a hollow portion of the roller 1 by press fit, and a pair of annular sealing members 3 for preventing leak of toner 4. The roller 1 and the metal shaft 2 are bonded to each other with a conductive adhesive agent. The reason the thickness of the roller 1 is set to 0.5 mm to 15 mm is as follows: If the thickness of the roller 1 is not more than 0.5 mm, it is difficult to obtain an appropriate nip. If the thickness of the roller 1 is not less than 15 mm, the roller 1 is so large that it is difficult to reduce the size and weight of an apparatus in which the developing roller 10 is mounted.

The metal shaft 2 is made of metal such as aluminum, aluminum alloy, SUS, and iron or ceramics.

The sealing member 3 is made of nonwoven fabric such as Teflon (registered trade mark) or a sheet.

The roller 1 has the conductive rubber layer composed of the semiconductive rubber composition essentially on the outermost layer thereof. The roller 1 may have a multi-layer construction such as a two-layer construction in dependence on demanded performance. But it is preferable that the roller 1 has a one-layer conductive rubber layer composed of the semiconductive rubber composition of the present invention. Thereby the one-layer conductive rubber layer has little variations in the properties thereof and can be manufactured at a low cost.

The developing roller 10 of the present invention can be produced by carrying out a conventional method. For example, the semiconductive rubber composition is preformed as a tube by a rubber extruder. The preformed molded tube is vulcanized at 160° C. for 15 to 120 minutes, a metal shaft is inserted into a hollow portion of the tube, bonded thereto, and the surface thereof is polished. Thereafter the tube is cut to a predetermined size.

The optimum vulcanizing time period is set by using a vulcanization testing rheometer (for example, Curast meter).

The vulcanization temperature may be set around 160° C. in dependence on necessity. To suppress the contamination of the electrophotographic photoreceptor and the like and reduce the compression set of the semiconductive rubber composition, it is preferable to set conditions by which the preformed material can be vulcanized to a possible highest extent. A conductive foamed roller may be formed by adding a blowing agent to the above-described kneaded material.

The surface of the developing roller 10 is irradiated with ultraviolet rays to form an oxide film thereon. More specifically, after the developing roller 10 is washed with water, by using an ultraviolet ray irradiation lamp, it is irradiated with ultraviolet rays (wavelength: 184.9 nm and 253.7 nm) at intervals of 90 degrees in its circumferential direction for three to eight minutes by spacing the ultraviolet ray irradiation lamp at 10 cm from the developing roller 10. The developing roller 10 is rotated by 90 degrees four times to form the oxide film on its entire peripheral surface (360 degrees).

The developing roller 10 produced in the above-described manner has an excellent wear resistance. More specifically, in a test of printing a one-percent image on a plurality of sheets of paper, it is not until the one-percent image is printed on more than 8,000 sheets of paper that toner is present on the front face of the sealing portion. The developing roller 10 has a friction coefficient in the range of 0.4 to 0.53 when the friction coefficient is measured in accordance with the method described in the examples of the present invention.

The present invention is described below in detail by way of examples. But needless to say, the present invention is not limited to the examples.

Chloroprene rubber: Produced by Showa Denko K.K.

Acrylonitrile-butadiene rubber (NBR): "Nippol DN401LL" produced by Zeon Corporation. (low-nitrile NBR containing acrylonitrile at 18%)

(b) Filler

Zinc oxide: Two kinds of zinc oxides produced by Mitsui Mining and Smelting Co., Ltd.

Carbon black: "Asahi #15" produced by Asahi Carbon Co., Ltd. (average primary particle diameter: 122 nm, weakly conductive)

(c) Vulcanizing Agent

Sulfur: powdery sulfur produced by Tsurumi Chemical Industry Co., Ltd.

Ethylene thiourea: "Accel 22-S" produced by Kawaguchi Chemical Industry Co., Ltd.

(d) Acid-accepting Agent

Hydrotalcite: "DHT-4A-2" produced by Kyowa Chemical Industry Co., Ltd.

In accordance with the mixing ratio shown in table 1, the components were supplied to a 10 L kneader in the order of the rubber component, the carbon black, and the zinc oxide. These components were kneaded at a discharge temperature of 110° C. The vulcanizing agent and the acid-accepting agent were added to the obtained kneaded material. Thereafter all the components were kneaded by using a roll for five minutes to obtain sheet-shaped and ribbon-shaped compounds.

TABLE 1

| | | | Comparison Example 1 | Example 1 | Example 2 | Example 3 | Example 4 | Example 5 | Example 6 | Example 7 |
|---|---|---|---|---|---|---|---|---|---|---|
| Epichlorohydrin rubber | | | 60 | 50 | 50 | 50 | 30 | 30 | | |
| Polyether copolymer | | | | | | | | | 15 | 15 |
| Chloroprene rubber | | | 40 | 40 | 30 | 10 | 20 | 5 | 10 | 75 |
| Acrylonitrile-butadiene rubber | | | | 10 | 20 | 40 | 50 | 65 | 75 | 10 |
| Carbon black | | | 40 | 40 | 40 | 40 | 40 | 40 | 40 | 40 |
| Zinc oxide | | | 5 | 5 | 5 | 5 | 5 | 5 | 5 | 5 |
| Sulfur | | | 0.5 | 0.5 | 0.5 | 0.5 | 0.5 | 0.5 | 0.5 | 0.5 |
| Ethylene thiourea | | | 1.4 | 1.4 | 1.4 | 1.4 | 1.4 | 1.4 | 1.4 | 1.4 |
| Hydrotalcite | | | 3 | 3 | 3 | 3 | 3 | 3 | 3 | 3 |
| Evaluation of rubber composition | | Compression set(%) | 11 | 5.6 | 6.0 | 7.0 | 7.5 | 8.5 | 9.2 | 5.2 |
| | | Hardness | 64 | 61 | 58 | 56 | 55 | 53 | 51 | 59 |
| | | Maximum elongation(%) | 260 | 290 | 280 | 260 | 300 | 320 | 400 | 320 |
| Evaluation of roller | Oxide film | Ultraviolet ray-irradiated period of time | 10 minutes | 8 minutes | 7 minutes | 5 minutes | 5 minutes | 5 minutes | 3 minutes | 8 minutes |
| | | Efficiency of irradiation | Δ | Δ~○ | Δ~○ | ○ | ○ | ○ | ◎ | Δ~○ |
| | Wear resistance | Friction coefficient | 0.50 | 0.53 | 0.45 | 0.43 | 0.41 | 0.41 | 0.51 | 0.53 |
| | | Wear of sealing portion | 7,000<br>Δ | 10,000<br>◎ | 10,000<br>◎ | 9,000<br>○ | 9,000<br>○ | 8,500<br>○ | 8,000<br>Δ | 8,000<br>Δ |
| Synthetic evaluation | | | Δ | ◎~○ | ◎~○ | ◎~○ | ◎~○ | ◎~○ | ○ | ○ |

As the components of the conductive rubber layer of the examples 1 through 7 and the comparison example 1, the following substances were used:

(a) Rubber Component

Epichlorohydrin rubber "Epichlomer D" produced by Daiso Co., Ltd.

EO (ethylene oxide)/EP (epichlorohydrin)=61 mol %/39 mol %.

Polyether copolymer: "Zeospan ZSN8030" produced by Zeon Corporation.

EO (ethylene oxide)/PO (propylene oxide)/AGE (allyl glycidyl ether)=90 mol %/4 mol %/6 mol %

Number-average molecular weight Mn=80,000

Measurement of Compression Set

The sheet-shaped compound was vulcanized by using a hydraulic press at 160° C. for 60 minutes to prepare specimens for measuring the compression set specified in JIS K 6262.

The compression set of each specimen for measuring the compression set was measured at a temperature of 70° C. for 24 hours and at a compression rate of 25% in accordance with "Permanent set testing methods for rubber, valcanized or thermoplastic" specified in JIS K 6262.

Measurement of Hardness

The hardness of each prepared specimen for measuring the compression set was measured by using a durometer of hardness test type A specified in JIS K6253.

Measurement of Maximum Elongation

Sheet-shaped compounds were vulcanized by using a hydraulic press at 160° C. for 30 minutes to prepare slabs each having a size of 10 cm×10 cm and a thickness of 2 mm. The slabs were punched with a dumbbell of No. 3 to obtain specimens. To measure the maximum elongation (maximum elongation) of each of the specimens when they were fractured, the specimens were pulled at 500 mm/minute until they were fractured.

Formation of Conductive Rubber Roller

Each of the ribbon-shaped compounds was extruded as a tube having an inner diameter of ϕ9 mm and an outer diameter of ϕ21 mm by using a vacuum-type rubber extruder having a diameter of ϕ60 mm The temperature of a collet was set to 50° C. In this process, it is possible to remove bubbles and the water content at a rate more than the water content adsorbed to rubber molecules. Each of the obtained tube was inserted into a metal shaft having an inner diameter of ϕ10 mm in a pressurized atmosphere. Thereafter to vulcanize each tube, it was heated by a vulcanizing can at 160° C. for 60 minutes.

After the ends of the tube was cut, traverse abrasion was carried out with a cylindrical abrading machine. Thereafter the surface of each tube was abraded to a mirror-like surface finish to set the surface roughness Rz thereof specified by JIS B 0601 to the range of 3 to 5 μm. As a result, conductive rubber rollers each having a diameter of ϕ20 mm (tolerance: 0.05 mm) were obtained.

After the surface of each of the conductive rubber rollers was washed with water, the surface thereof was irradiated with ultraviolet rays to form an oxidized layer thereon. By using an ultraviolet ray irradiation lamp ("PL21-200" produced by Sen Lights Corporation), the surface of each conductive rubber roller was irradiated with ultraviolet rays (wavelength: 184.9 nm and 253.7 nm) at intervals of 90 degrees in its circumferential direction for the period of time described in table 1. The ultraviolet ray irradiation lamp was spaced by 10 cm from the conductive rubber roller. Each conductive rubber roller was rotated by 90 degrees four times to form the oxide film on its entire peripheral surface (360 degrees).

Efficiency of Forming Oxide Film

The conductive rubber roller whose surface was irradiated with ultraviolet rays for not more than three minutes before the oxide film was formed thereon was marked as ◎. The conductive rubber roller whose surface was irradiated with ultraviolet rays for three to six minutes before the oxide film was formed thereon was marked as ○. The conductive rubber roller whose surface was irradiated with ultraviolet rays for six to nine minutes before the oxide film was formed thereon was marked as Δ-○. The conductive rubber roller irradiated with ultraviolet rays for not less than nine minutes before the oxide film was formed thereon was marked as Δ.

When the conductive rubber roller of the comparison example 1 was irradiated ultraviolet rays for five minutes, it had a friction coefficient of 0.95. Thus the conductive rubber roller of the comparison example 1 cannot be put into practical use.

Measurement of Friction Coefficient

The friction coefficient of each of the conductive rubber rollers prepared in the above-described method was measured as described below.

Figure 2:
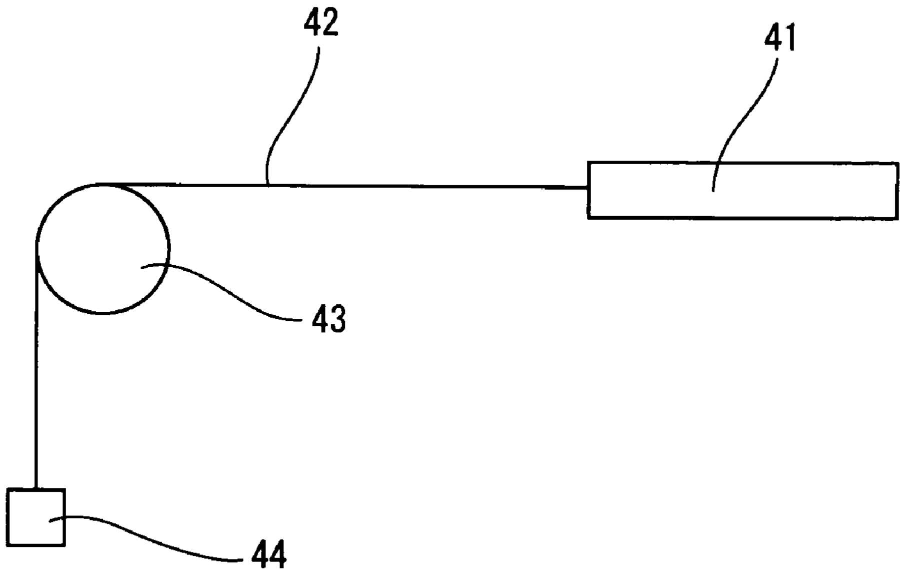
FIG. 2 shows a method of measuring the friction coefficient of the conductive rubber roller of the present invention.

With reference to FIG. 2, the friction coefficient of a conductive rubber roller 43 was measured by substituting a numerical value measured with a digital force gauge 41 of an apparatus into the Euler's equation. The apparatus has a digital force gauge (Model PPX-2T) manufactured by Imada Co., Ltd.) 41, a friction piece (commercially available OHP film, made of polyester, in contact with the peripheral surface of the conductive rubber roller 43 in an axial length of 50 mm) 42, a weight 44 weighing 20 g, and the conductive rubber roller 43.

Wearability of Sealing Portion

Each of the conductive rubber rollers prepared in the above-described manner was mounted on a commercially available laser printer as its developing roller to evaluate the wearability of the sealing portion thereof. In the laser printer, one-component unmagnetic toner having a positive electrostatic property was used.

Printing was made by forming a one-percent image on a plurality of sheets of paper. The degree of contamination of the sealing portion was checked visually, each time 500 sheets of paper were printed. It is decided that the developing roller has worn when toner is present on the front face of the sealing portion. Table 1 shows the number of sheets of paper on which printing was made, when the toner was present on the front face of the sealing portion. The developing roller which was very low in the degree of wear in its sealing portion and thus excellent in its durability (not less than 10,000 sheets of paper) was marked as ◎. The developing roller which was low in the degree of wear in its sealing portion and thus good in its durability (8,500 to 9,500 sheets of paper) was marked as ○. The developing roller which was high in the degree of wear in its sealing portion and thus inferior in its durability (7,000 to 8,000 sheets of paper) was marked as Δ. The guaranteed number of sheets of the commercially available laser printer is 6,500. Thus the developing roller which wore to a high extent before 6,500 sheets of paper cannot be used practically.

Synthetic Evaluation

The following evaluation was made in consideration of the results of the above-described tests.

◎: The developing roller is excellent in durability in practical use and capable of keeping formation of a high-quality image for a long time.

○-◎: The developing roller is excellent in durability in practical use and capable of keeping formation of a high-quality image.

○: The developing roller is good in durability in practical use and capable of keeping formation of a high-quality image.

Δ: The developing roller is inferior in durability in practical use. When the developing roller has worn, toner is capable of flowing into the sealing portion thereof.

X: The developing roller is inferior and cannot be put into practical use.

As shown in table 1, in the synthetic evaluation, the rubber compositions of the examples 1 through 5 were marked as ○-◎ and the rubber compositions of the examples 6 and 7 were marked as ○. On the other hand, the conductive rubber roller of the comparison example 1 was marked as Δ.

What is claimed is:

1. A conductive rubber roller having a conductive rubber layer composed of a semiconductive rubber composition on an outermost layer thereof, having an oxide film formed on a surface thereof, and having a friction coefficient of said surface in a range of 0.1 to 1.5;

wherein said semiconductive rubber composition contains a rubber component of copolymerized rubber containing ethylene oxide; chloroprene rubber; and acrylonitrile-butadiene rubber;

wherein the copolymerized rubber containing ethylene oxide, the chloroprene rubber, and the acrylonitrile-butadiene rubber are dispersed finely;

wherein a mixing amount of said copolymerized rubber containing ethylene oxide is smaller than that of said acrylonitrile-butadiene rubber; and a mixing amount of said chloroprene rubber is smaller than that of said acrylonitrile-butadiene rubber;

wherein said mixing amount of said copolymerized rubber containing ethylene oxide is not less than 5 parts by mass for 100 parts by mass of the rubber component, said mixing amount of said acrylonitrile-butadiene rubber is not less than 10 parts by mass and not more than 65 parts by mass for 100 parts by mass of the rubber component, and said mixing amount of said chloroprene rubber is not less than 5 parts by mass and not more than 75 parts by mass for 100 parts by mass of the rubber component; and wherein a compression set is not less than 1% nor more than 10%; a hardness measured in accordance with JIS A is not less than 50 degrees nor more than 63 degrees; and a maximum elongation is not less than 260%;

wherein the acrylonitrile-butadiene rubber is low-nitrile acrylonitrile-butadiene rubber containing acrylonitrile at not more than 25%.

2. The conductive rubber roller according to claim 1, wherein said copolymerized rubber containing said ethylene oxide essentially contains an epichlorohydrin copolymer.

3. The conductive rubber roller according to claim 2, wherein said semiconductive rubber composition shows ionic conductivity.

4. The conductive rubber roller according to claim 1, wherein said semiconductive rubber composition shows ionic conductivity.

5. The conductive rubber roller, according to claim 1, which is used as a developing roller in an image-forming mechanism of an electrophotographic apparatus.

6. The conductive rubber roller according to claim 1, wherein said mixing amount of said copolymerized rubber containing ethylene oxide is not less than 15 parts by mass for 100 parts by mass of the rubber component, said mixing amount of said acrylonitrile-butadiene rubber is not less than 20 parts by mass and not more than 65 parts by mass for 100 parts by mass of the rubber component, and said mixing amount of said chloroprene rubber is not less than 10 parts by mass and not more than 40 parts by mass for 100 parts by mass of the rubber component.

* * * * *